United States Patent [19]
Lamb

[11] Patent Number: 6,072,258
[45] Date of Patent: Jun. 6, 2000

[54] PERMANENT MAGNET COUPLER WITH ADJUSTABLE AIR GAPS

[75] Inventor: Karl J. Lamb, Port Angeles, Wash.

[73] Assignee: Magna Force, Inc., Port Angeles, Wash.

[21] Appl. No.: 09/368,385

[22] Filed: Aug. 4, 1999

[51] Int. Cl.[7] .................................................. H02K 1/00
[52] U.S. Cl. ........................... 310/191; 310/103; 310/90; 310/105; 310/75 D; 310/78; 310/115
[58] Field of Search .................................... 310/191, 103, 310/90, 105, 75 D, 78, 115, 121

[56] References Cited

U.S. PATENT DOCUMENTS

| | | | |
|---|---|---|---|
| 3,659,126 | 4/1972 | Whipker | 310/92 |
| 4,571,528 | 2/1986 | McGee et al. | 318/138 |
| 5,376,862 | 12/1994 | Stevens | 310/75 D |
| 5,539,266 | 7/1996 | Stevens | 310/75 D |
| 5,650,679 | 7/1997 | Bogg, III et al. | 310/105 |
| 5,739,627 | 4/1998 | Lamb | 310/75 D |
| 5,821,658 | 10/1998 | Boggs, III | 310/105 |
| 5,834,872 | 11/1998 | Lamb | 310/103 |
| 5,880,548 | 3/1999 | Lamb | 310/103 |
| 5,903,075 | 5/1999 | Lamb | 310/75 D |

*Primary Examiner*—Nestor Ramirez
*Assistant Examiner*—Thanh Lam
*Attorney, Agent, or Firm*—Seed IP Law Group PLLC

[57] ABSTRACT

A cage carrying two axially adjustable conductors is mounted on one shaft and a rotor is mounted on a second coaxial shaft to occupy a position between the conductors. Permanent magnets on the rotor have poles spaced by air gaps from the conductors. The air gaps are adjusted by sliding the conductors toward and away from one another along slide members on the cage by use of adjustment units engaging the conductor rotors. Alternatively, the conductors can be mounted on the rotor, and the magnets can be adjustably mounted on the cage.

24 Claims, 4 Drawing Sheets

6,072,258

PERMANENT MAGNET COUPLER WITH ADJUSTABLE AIR GAPS

TECHNICAL FIELD

The present invention relates to magnetic couplers having cooperating permanent magnet rotors and electron-conductor rotors separated by air gaps.

BACKGROUND OF THE INVENTION

Permanent magnet couplers of the general type disclosed in U.S. Pat. No. 5,477,094 have a magnet rotor and conductor rotor interacting to transmit power between input and output shafts. The magnet rotor has a plurality of circumferentially spaced permanent magnets having their opposite poles separated by air gaps from electro-conductive conductor elements provided by the conductor rotor on opposite axial sides of the magnet rotor. For many applications it is preferred that the air gaps be readily adjustable after installation of the coupler to obtain or vary "soft start" at start up, meaning that initially during start up there is a noticeable rotational slip between the rotors which gradually reduces to a minimum in a few seconds as the output shaft builds up speed from zero to a maximum. Less starting torque is required to drive a given load if the coupler is matched to the load such that there is a soft start experienced during start up. Also, there is less shock to the power transfer system when soft start is provided.

Providing for adjustment of the air gaps permits a given magnetic coupler to be suitable for maximum performance in a variety of load applications without a need to change the number of magnets in the magnet rotor. Providing for such adjustment after installation of the coupler makes it possible to field adjust soft start of a coupler without removing or disconnecting the coupler if the load at the installation is changed.

SUMMARY OF THE INVENTION

The present invention aims to provide an air gap adjustment system that is simple to utilize in the field after installation of the coupling. In accordance with the present invention, a magnet rotor is mounted on one shaft and a cage surrounding the magnet rotor is mounted on a second coaxial shaft. In the preferred embodiments a pair of electro-conductive units, spaced by air gaps from opposite ends of the magnet rotor are slide-mounted on the cage to vary the air gaps. Adjustment bolts or other adjustment devices extend axially between the cage and the electro-conductive units for axially varying the air gaps responsive to turning of the adjustment devices and thereby axially moving the electro-conductive units relative to the cage.

DETAILED DESCRIPTION OF THE INVENTION

Figure 1:
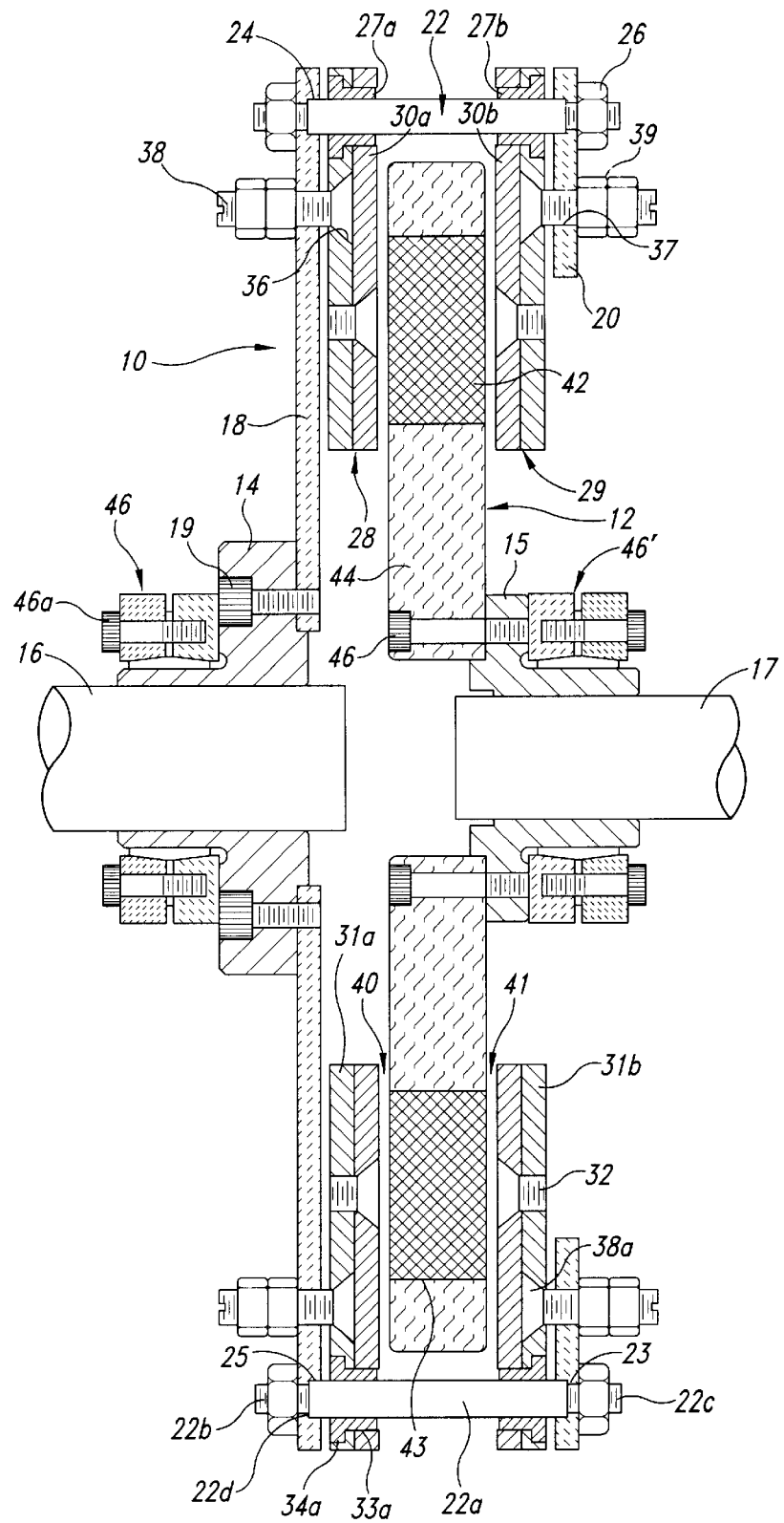
FIG. 1 is a sectional view through a coupler embodying a first embodiment of the invention and taken along the rotary axis of the coupler.

Referring to the drawings, a cage 10 and magnet rotor 12 are mounted by hubs 14, 15 on coaxial input and output shafts 16, 17, respectively. The cage 10 has a mounting disc 18 secured by bolts 19 to the hub 14 and has an annular mounting plate 20 which is held in parallel spaced relation to the disc 18 by a circumferentially spaced set of spacer bolts 22. Each of these spacer bolts has a central shank 22a and terminal threaded portions 22b, 22c merging at annular shoulders 22d. These shoulders engage annular seats 23 at the juncture of threaded bores 24 and smooth counterbores 25 adjacent the outer perimeters of the mounting members 18, 20. Nuts 26 are screwed onto the threaded end portions 22b, 22c of the bolts 22 to hold the bolts and mounting members 18, 20 together as a rigid unit.

A respective pair of stepped bushings 27a, 27b receive the bolt shanks 22a to function as slides for a pair of conductor units 28, 29, comprising a pair of electro-conductive rings 30a, 30b, preferably copper, and a pair of magnetic backing rings 31a, 31b, preferably mild steel. The electro-conductive rings are secured to the backing rings by screws 32 having shanks threaded into the backing members 31a, 31b and having beveled heads seated in the rings 30a, 30b, flush with the ring faces which are adjacent the magnet rotor 12. Complementing bores 33a, 34a in the rings 30a–30b and 31a–31b contain the bushings 27a, 27b.

The backing rings 31a, 31b have beveled holes 36 arranged to register with threaded bores 37 through the mounting members 18, 20 of the cage 10. Adjustment bolts 38 are threaded into the bores 37 and have beveled heads 38a free to rotate in the beveled holes 36 in the backing rings 31a, 31b, responsive to being turned by application of a tool, to the outer ends of the bolts. To receive the tool, the ends of the bolts 38 may be slotted, recessed, or externally shaped with flats. The bolts 38 have pairs of lock nuts 39.

It will be appreciated that since the heads 38a of the adjustment bolts 38 are kept in the beveled holes 36 by the overlying electro-conductive rings 30a, 30b, turning of the bolts 38 results in axial movement of the conductor units 28, 29, thereby adjusting the width of air gaps 40, 41 between the electro-conductive rings 30a, 30b and a set of permanent magnets 42 presented by the magnet rotor 12. These magnets are mounted in a set of mating holes 43 arranged in a circular pattern which extend through a magnet rotor disc 44 of non-magnetic material. The disc 44 is mounted by bolts 46 on the hub 15.

The described coupler has its hubs 14, 15 fixed on the shafts 16, 17 as by compression couplings 46, 46' tightened in place by screws 46a. Preliminary to assembly of the coupler on the shafts 16–17, the backing rings 31, 31b are normally mounted by the adjustment bolts 38 on the mounting disc 18 and mounting ring 20 after insertion of the bushing 27a, 27b, and then the electroconductive rings 30a, 30b are mounted by the screws 32 on the backing rings to form subassemblies. Next, the hub 14 and the subassembly comprising the disc 18 and conductor unit 28 is applied to the shaft 16, and the other subassembly comprising the ring 20 and conductor unit 29 is inserted over the open end of the shaft 17 to loosely surround this shaft. The next step is to install the magnet rotor unit 12 with its hub 15 mounted on the shaft 17. Then the bolts 22 are installed by endwise insertion through the mounting members 18, 20 and the bushings 27a, 27b so that when the nuts 26 are applied, the cage 10 is assembled with the conductor units 28, 29 supported by the cage and spaced by air gaps 40, 41 from the magnets 42.

When the shaft 16 is driven by a prime mover, eddy currents are induced in the electro-conductive members 30a, 30b by the magnetic flux emitting from the magnets and confined by the ferrous backing members 31a, 31b. The resulting magnetic effect created in the electro-conductive members 30a, 30b causes repulsion of the conductor units 28, 29 from the magnet rotor 12 and results in rotation of the conductor units 28, 29 and cage 10, thereby driving the shaft 17 in response to the rotation of the shaft 16, but at a lesser rotational speed, defined as the slip. The slip at start up and the ultimate slip after start up is determined by the width of the air gaps 40, 41. The adjusting screws 38 make it possible to adjust the air gaps after the coupler has been installed and operated under the particular load conditions experienced at that use site. The air gaps are adjusted by trial and error to fine tune the soft start and operating slips to be most advantageous for the operating conditions experienced.

To assist in obtaining equal adjustment of the screws 38, indexing marks can be scribed on the support members 18, 20 radiating from the periphery of the mouths of the bores 37 to register with a longitudinal indicator groove in the screws. Also, gauge strips can be inserted in the air gaps and the bolts 38 tightened until like pressure is sensed on the gauge strips. Although it is normally preferred to have the air gaps 40, 41 the same width, this is not essential for effective operation of the coupler.

Figure 2:
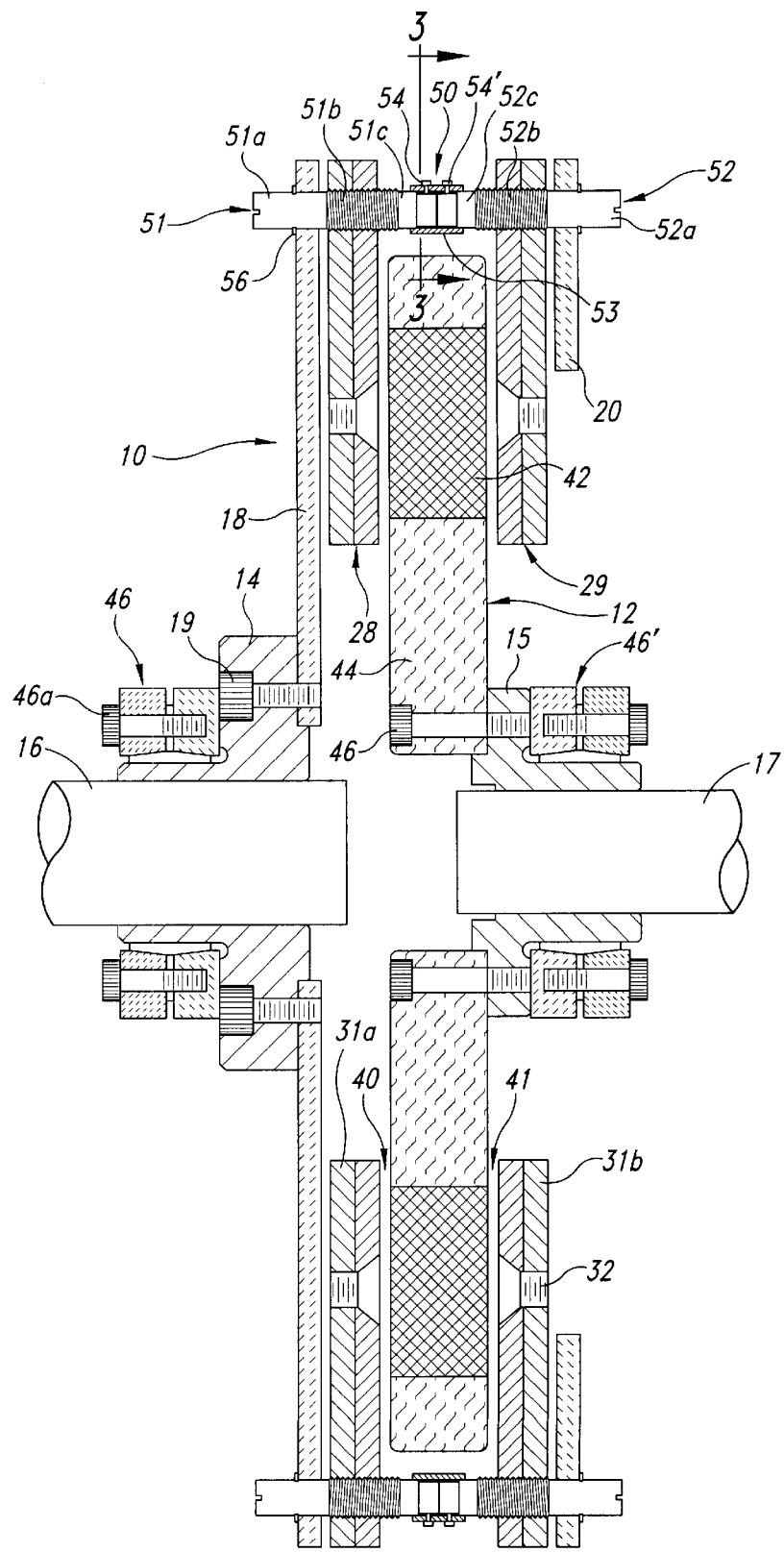
FIG. 2 is a similar sectional view of a second embodiment.
Figure 3:
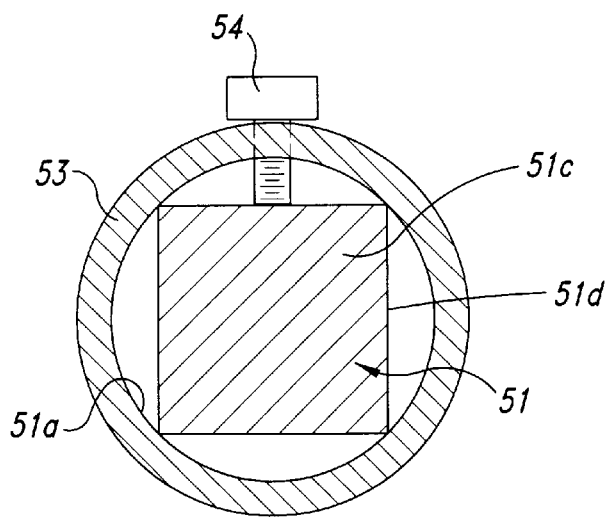
FIG. 3 is a detail sectional view taken as indicated by line 3—3 in FIG. 2.

FIGS. 2 and 3 illustrate a second embodiment of the invention in which the specific adjustment mechanism is varied. Otherwise, those parts which are the same as in the first embodiment will be given the same reference numeral. In the second embodiment a set of adjustment bolt assemblies 50 are located between the spacer bolts 22 and extend in parallel relation thereto. Each adjustment bolt assembly 50 comprises bolt components 51–52 joined by a sleeve coupler 53. Bolt component 51 has a round head section 51a, an intermediate threaded section 51b, and a shank section 51c preferably with one or more flat sides 51d such as provided by a square cross-section, for example, as shown in FIG. 3. Likewise, the bolt component 52 has a round head section 52a, an intermediate threaded section 52b, and a shank section 52c preferably with one or more flat sides complementing shank section 51c. The threads on the threaded sections 51b–52b have the same pitch but are of opposite hand. Sleeve coupler 53 has a longitudinal through bore 53a shaped to receive and interfit with the shank sections 51c, 52c so that when the bolt components 51–52 are coupled together by the sleeve coupler 53 the bolt components will turn in unison. Set screws 54, 54' are threaded into radial holes adjacent opposite ends of the sleeve 53 to engage a flat side of the shank sections 51c, 52c and hold the sleeve against endwise movement relative to the associated bolt unit 50. The head sections 51, 52a of the bolt components are formed with circumferential grooves to receive C-clips 56 and their outer ends are slotted or otherwise shaped to receive a screwdriver or other tool for selectively turning the adjustment bolt assemblies 50.

For receiving the adjustment bolt components 51–52 the mounting disc 18, conductor units 28–29, and mounting plate 20 have sets of registering holes. The holes through the conductor units 28–29 are threaded oppositely to match the threaded sections 51b, 52b, respectively, of the adjustment bolt components, and the holes through the mounting members 18, 20 preferably are sized to slideably receive the bolt components 51–52.

When the adjustment bolt assemblies 50 are in operating position they are threaded through the conductor units 28, 29, extend outwardly through the mounting components 18, 20 of the cage 10, and are held against endwise movement relative to the cage by the C-clips 56. It will be apparent that when the adjustment bolt units 50 are turned the result will be like axial movement of the conductor units 28, 29 along the spacers 22 toward the magnet rotor 12 or away from the magnet rotor, depending upon the turning direction selected for the adjustment bolt assemblies. Hence, equal adjustment of the air gaps 40, 41 is achieved merely by progressively turning the bolt assemblies 50.

Assembly of the second embodiment is performed like the first embodiment, except that the step of applying the adjustment bolts 38 is eliminated, and the adjustment bolt units 50, with the C-clips 56 preferably in place, are installed as the final step after completion of assembly of the cage by application of the spacer bolts 22. Installation of the bolt units 50 can be done by screwing the bolt component 51 through the conductor unit 28 with the conductor unit at a maximum gap position abutting the mounting disc 18, and likewise screwing the other bolt component 52 through the other conductor unit 29 with the latter at a maximum gap position abutting the mounting plate 20 after sliding the coupling sleeve 53 completely onto the shank 51c. During the described installation of the bolt components 51, 52 they are screwed into the conductor units 28, 29 until the C-clips 56 lightly engage the outer faces of the mounting disc 18 and mounting plate 20. Next the sleeve 53 is shifted endwise part-way onto the adjoining shank 52c and the set screws 54, 54' are tightened against the shanks 51c, 52c. With the described arrangement the sleeve 53 causes the bolt components 51, 52 to turn in unison, the set screws 54, 54' assembly prevents them from separating, and the C-clips 56 prevent the assembled adjustment bolt unit 50 from moving endwise relative to the cage 10. It will be apparent that in this embodiment an annular shoulder may be provided on the bolt components 51, 52 in place of the C-clips 56.

Figure 5:
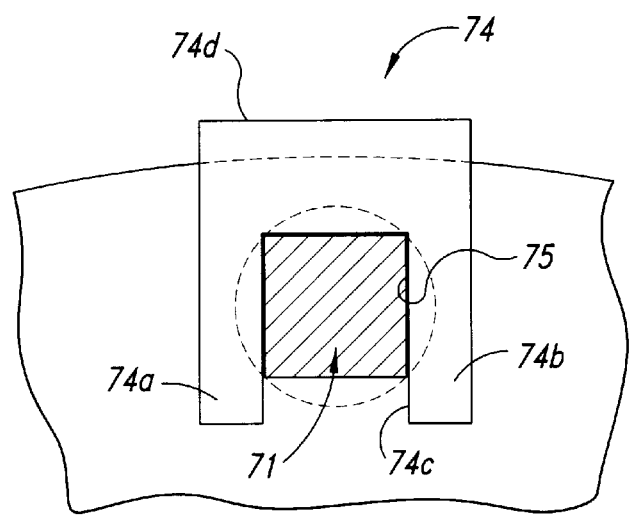
FIG. 5 is a detail transverse sectional view taken as indicated by line 5—5 in FIG. 4.
Figure 4:
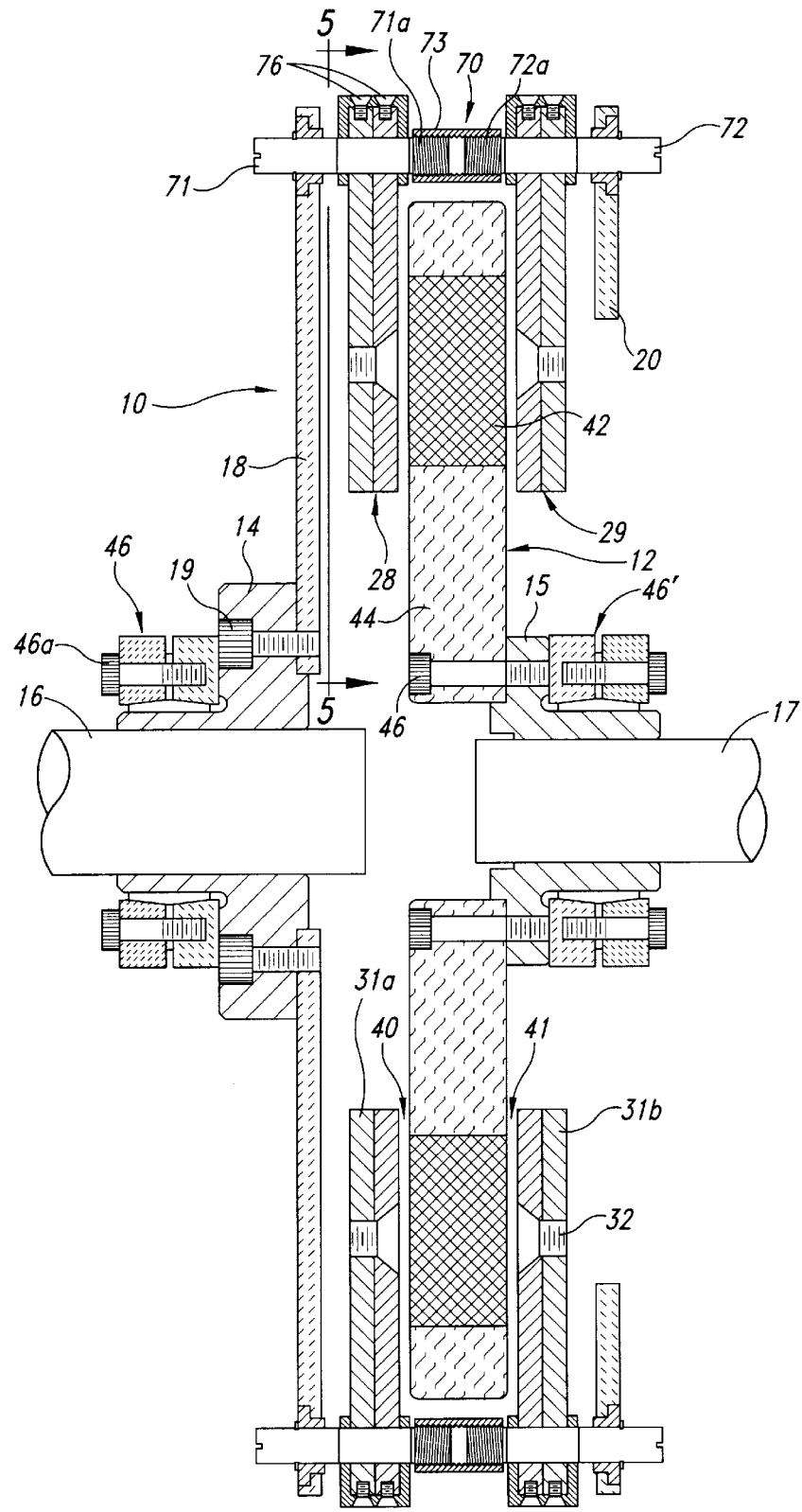
FIG. 4 is a sectional view through a coupler showing a third embodiment of the invention.

FIGS. 4–5 illustrate a third embodiment in which the gap adjustment mechanism comprises turnbuckles 70 extending between the conductor units between the spacer bolts 22. Each turnbuckle 70 has two non-rotating bolt shanks 71–72 formed with threaded opposed end sections 71a–72a screwed into a central coupling sleeve 73. The threads on the end sections 71a–72a are of opposite hand and are complemented by the threads in the bore of the sleeve 73 so that when the sleeve is turned the shanks 71–72 more in unison toward one another or in the opposite direction depending upon the direction that the sleeve is turned. The turnbuckle shanks 71–72 can be maintained in fixed engagement with the conductor rotors 28, 29 in any suitable manner. For example, U-clips 74 can interfit with the shanks 71–72 and fit over the rim of the conductor rotors. In such a case, the U-clips 74 may have bifurcated legs 74a, 74b interfitting with grooves 75 in the shanks 71–72. As shown in FIG. 5, the grooved portions of the shanks may have a square cross-section to provide flats engaged by flat inner edges 74c the bifurcations of the clip legs 74a, 74b. Screws 76 extend through the center web 74d of the U-clips and are threaded into the rim of the conductor rotors to fix the clips 74 and turnbuckles 70 in place. The sleeves 73 are preferably hexagonal in exterior shape for receiving a wrench for adjustment or are provided with radial holes to receive a tool for turning the sleeves to adjust extension or retraction of the turnbuckles to responsively enlarge or decrease the air gaps 40–41.

Although it is preferred to have the magnet rotor located between two conductor elements 30a–30b, the cage 10 may have two magnet rotors in the place of the conductor elements, and a single conductor rotor in place of the magnet rotor 12. In this case the conductor rotor would preferably comprise two conductor rings mounted on opposite sides of a ferrous disc secured by the bolts 46 to the hub 15.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An adjustable magnetic coupler comprising:
    first and second rotary shafts having parallel rotary axis,
    a cage mounted on said first shaft and surrounding said axis;
    a magnet rotor mounted on said second shaft and extending radially within said cage from said second shaft, said magnet rotor containing permanent magnets;
    two electro-conductive units movably carried by said cage and spaced by air gaps from said magnets at opposite ends of the magnet rotor; and
    gap adjustment means for controlling the axial location of said electro-conductive units axially relative to said cage and magnet rotor to selectively vary said air gaps.

2. A coupler according to claim 1 in which said cage includes elongated members extending parallel to said axis, and said conductor units are slidably mounted on said members.

3. A coupler according to claim 2 in which said gap adjustment means includes adjustment bolts extending between said cage and said conductor units such that turning of the adjustment bolts varies said air gaps by positioning said conductor units along said members.

4. A coupler according to claim 2 in which said gap adjustment means includes turnbuckles extending between said conductor units for selectively moving said conductor units in unison in opposite directions toward or away from said magnet rotor to vary said air gaps.

5. A coupler according to claim 2 in which said gap adjustment means includes an adjustment bolt unit with threaded sections having their threads of opposite hand, said threaded sections interacting with said conductor units such that turning of such bolt unit responsively moves the conductor units in unison in opposite directions.

6. A coupler according to claim 1 in which said cage comprises a mounting disc mounted on said first shaft, a mounting ring axially spaced from said mounting disc, and spacer members extending between said disc and ring radially outward of said magnet rotor, and in which said electro-conductive units are slidably mounted on said spacer members.

7. A coupler according to claim 6 in which said gap adjustment means comprises a first set of gap adjustment bolts extending between said mounting disc and one of said electro-conductive units, and a second set of gap adjustment bolts extending between said mounting ring and the other one of said electro-conductive units.

8. A coupler according to claim 7 in which said first set of gap adjustment bolts has a threaded engagement with said mounting disc, and said second set of adjustment bolts has a threaded engagement with said mounting ring.

9. An adjustable magnetic coupler comprising:
    first and second rotary shafts having a rotary axis;
    a mounting unit on said first shaft and surrounding said axis;
    a magnet rotor mounted on said second shaft and containing permanent magnets;
    electro-conductive units slidably carried by said mounting unit and spaced by air gaps from said magnets at opposite ends of the magnet rotor; and
    adjustment bolt units engaging said electro-conductive units for selectively moving them axially relative to said mounting unit and magnet rotor to thereby control the width of said air gaps.

10. A coupler according to claim 9 in which said adjustment bolt units each have heads rotationally interfitting with said electro-conductive units, and have shanks having a threaded interfit with said mounting unit whereby turning of said bolts causes axial movement of said electro-conductive units.

11. A coupler according to claim 9 in which said adjustment bolt units each have two spaced threaded sections threadably interfitting with respective of said electro-conductive units, said two threaded sections being of opposite hand whereby turning of said adjustment bolt units moves said electro-conductive units in unison in opposite directions.

12. An adjustable magnetic coupler comprising:
    first and second coaxial rotary shafts having a rotary axis;
    a cage mounted on said first shaft and surrounding said rotary axis;
    a magnet rotor mounted on said second shaft and extending radially within said cage, said magnet rotor presenting a plurality of permanent magnets providing two sets of poles facing oppositely in parallel relation to said rotors axis; and
    first and second conductor units slideably mounted on said cage for axial movement and providing electro-conductive elements in said cage spaced by air gaps from respective ones of said sets of poles; and
    rotary gap controlling devices engaging said conductor units for selectively moving said conductor units axially in opposite directions relative to said magnet rotor and cage responsive to turning of the gap controlling devices.

13. A coupler according to claim 12 in which said gap controlling devices each engage said cage and one of said conductor units.

14. A coupler according to claim 12 in which said gap controlling devices extend between said conductor units and operate by each having threads of opposite hand.

15. A coupler according to claim 14 in which each of said gap controlling devices comprises a turnbuckle.

16. A coupler according to claim 14 in which said threads of opposite hand interfit with complementing threads in said conductor units.

17. An adjustable magnetic coupler comprising:
    first and second coaxial rotary shafts having a rotary axis;
    a cage mounted on said first shaft and surrounding said rotary axis;
    a magnet rotor mounted on said second shaft and extending radially within said cage, said magnet rotor presenting a plurality of permanent magnets providing two sets of poles facing oppositely in parallel relation to said rotary axis;
    first and second conductor units slideably mounted on said cage for axial movement and providing electro-conductive elements in said cage spaced by air gaps from respective ones of said sets of poles; and
    turnable gap adjustment devices extending between said conductor units in parallel relation to said rotary axis, said devices being operative to move said conductor units in unison in opposite directions responsive to turning of said devices.

18. A coupler according to claim 17 in which said gap adjustment devices comprise an adjustment bolt unit with threaded sections having threads of opposite hand, said threaded sections acting such that turning of said adjustment bolt unit responsively moves said conductor units in unison in opposite directions.

19. An adjustable magnetic coupler comprising:

two shafts having coaxial rotary axes, a first group having two sets of magnet poles, a second group having two conductor elements spaced by respective air gaps from respective ones of said sets of poles, a cage mounted on one of said shafts and having two axially spaced mounting elements carrying one of said groups, a rotor mounted on the other one of said shafts and carrying the other one of said groups, and a mechanism carried by said cage for axially moving one of said groups relative to said mounting elements such as to vary said air gaps.

20. An adjustable magnetic coupler according to claim 19 in which said first group is provided by magnets passing through said rotor, and said second group is mounted on said cage.

21. An adjustable magnetic coupler according to claim 19 in which said second group is mounted on opposite sides of said rotor, and said first group is provided by two axially spaced sets of magnets carried by said cage and operatively associated with said mechanism.

22. An adjustable coupler according to claim 19 in which said mechanism is a screw operating device.

23. An adjustable coupler according to claim 19 in which the group carried by the cage is slidably mounted on slide elements on the cage extending between said mounting elements and said mechanism is a screw mechanism passing through said mounting elements.

24. An adjustable coupler according to claim 23 in which the screw mechanism is a turnbuckle type of screw mechanism.

* * * * *